(12) United States Patent
Davis et al.

(10) Patent No.: US 10,415,411 B2
(45) Date of Patent: Sep. 17, 2019

(54) SPLINED DOG-BONE SEAL

(71) Applicant: United Technologies Corporation, Hartford, CT (US)

(72) Inventors: Timothy M. Davis, Kennebunk, ME (US); Jose R. Paulino, Saco, ME (US)

(73) Assignee: United Technologies Corporation, Farmington, CT (US)

(*) Notice: Subject to any disclaimer, the term of this patent is extended or adjusted under 35 U.S.C. 154(b) by 609 days.

(21) Appl. No.: 14/958,419

(22) Filed: Dec. 3, 2015

(65) Prior Publication Data

US 2016/0169021 A1 Jun. 16, 2016

Related U.S. Application Data (60) Provisional application No. 62/091,260, filed on Dec. 12, 2014.

(51) Int. Cl.
| | | |
|---|---|---|
| *F01D 11/00* | (2006.01) | |
| *F02C 7/28* | (2006.01) | |
| *F16J 15/08* | (2006.01) | |

(52) U.S. Cl.
CPC .............. *F01D 11/005* (2013.01); *F02C 7/28* (2013.01); *F16J 15/08* (2013.01); *F05D 2220/323* (2013.01); *F05D 2240/55* (2013.01); *F16J 15/0887* (2013.01)

(58) Field of Classification Search
CPC ...... F01D 11/003; F01D 11/005; F01D 9/023; F02C 7/28; F05D 2240/57; F05D 2240/59
See application file for complete search history.

(56) References Cited

U.S. PATENT DOCUMENTS

| | | |
|---|---|---|
| 4,318,668 A | 3/1982 | Chaplin et al. |
| 5,868,398 A | 2/1999 | Maier et al. |
| 8,651,497 B2 | 2/2014 | Tholen et al. |
| 8,763,403 B2 | 7/2014 | Lagasse et al. |
| 8,961,108 B2 | 2/2015 | Bergman et al. |
| 9,771,818 B2 * | 9/2017 | Budnick ............... F01D 11/005 |
| 9,845,695 B2 * | 12/2017 | Budnick ............... F01D 11/003 |
| 2009/0243228 A1 | 10/2009 | Heinemann et al. |
| 2011/0081234 A1 | 4/2011 | Durocher et al. |
| 2012/0306169 A1 * | 12/2012 | Giri ....................... F01D 11/005 277/641 |
| 2013/0266416 A1 | 10/2013 | Bergman et al. |
| 2014/0248127 A1 | 9/2014 | Chuong et al. |
| 2015/0315925 A1 * | 11/2015 | Budnick .................. F02C 7/28 415/214.1 |
| 2015/0330241 A1 * | 11/2015 | Chuong ................ F01D 11/001 415/173.1 |
| 2016/0281522 A1 * | 9/2016 | Graf ......................... F01D 9/00 |
| 2017/0335704 A1 * | 11/2017 | Davis .................... F01D 11/005 |
| 2018/0016923 A1 * | 1/2018 | Imfeld .................... F01D 9/023 |

OTHER PUBLICATIONS

EP search report for EP15199808.5 dated Apr. 14, 2016.

* cited by examiner

*Primary Examiner* — Nicholas L Foster
(74) *Attorney, Agent, or Firm* — O'Shea Getz P.C.

(57) ABSTRACT

Aspects of the disclosure are directed to a system for maintaining a seal about an engine centerline, comprising: a first component, a second component, and a dog-bone seal coupled to the first component and the second component, wherein the first component is configured with at least one spline that is configured to engage a slot in the dog-bone seal to radially center the dog-bone seal relative to the first component and the second component.

9 Claims, 7 Drawing Sheets

SPLINED DOG-BONE SEAL

This application claims priority to U.S. patent application Ser. No. 62/091,260 filed Dec. 12, 2014, which is hereby incorporated by reference.

BACKGROUND

A loss of a secondary flow of air into a gas-path of a turbine has a negative effect on engine fuel burn, performance/efficiency, and component life. Metal w-seals or dog-bone seals are commonly used to limit leakage of secondary flow between segmented or full-hoop turbine components.

Exposure to significant relative axial/radial deflections, intermittent loading points, and/or elevated temperatures can preclude the use of w-seals or cause w-seals to deteriorate and be ineffective over time.

Dog-bone seals, unlike most w-seals, are full-hoop (i.e. not split in one circumferential location) and therefor require significant radial clearance to mating hardware that form the seal cavity. As a result, dog-bone seals cannot be kept concentric with an engine centerline and therefore cannot be kept in alignment with sealing features on mating hardware, such as feather seal slots.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for maintaining a seal about an engine centerline, comprising: a first component, a second component, and a dog-bone seal coupled to the first component and the second component, wherein the first component is configured with at least one spline that is configured to engage a slot in the dog-bone seal to radially center the dog-bone seal relative to the first component and the second component. In some embodiments, the at least one spline comprises at least one pin attached to at least one pin slot in the first component. In some embodiments, the at least one pin is brazed to or attached to the at least one pin slot in the first component. In some embodiments, the at least one spline is formed by at least three pins. In some embodiments, the first component comprises a feather seal slot for coupling the first component and the dog-bone seal. In some embodiments, the second component comprises a second feather seal slot for coupling the second component and the dog-bone seal. In some embodiments, the system is associated with an aircraft. In some embodiments, the first component comprises a full-hoop component. In some embodiments, the second component comprises a segmented component. In some embodiments, the first component comprises a flow path component. In some embodiments, the dog-bone seal is configured to move relative to at least one of the first component and the second component within a range of approximately four-tenths of an inch.

Aspects of the disclosure are directed to a system comprising: a dog-bone seal comprising a slot, and at least one spline configured to couple to the slot to maintain a positional relationship between the dog-bone seal and a component. In some embodiments, the at least one spline comprises at least one pin attached to at least one pin slot in the component. In some embodiments, the at least one spline is formed by at least three pins.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a seal, such as a splined dog-bone seal. Relative to the use of a w-seal, the use of a dog-bone seal may provide for a more robust/durable seal. Relative to a conventional dog-bone seal, a dog-bone seal in accordance with this disclosure may provide for a reduction/minimization in terms of leakage at forward and aft sealing interfaces by remaining concentric/centered relative to forward and aft mating parts/devices/components. A dog-bone seal in accordance with this disclosure may fit within a shorter seal cavity relative to a conventional dog-bone seal cavity that does not have inner diameter (ID) and outer diameter (OD) radial bumper/stop features (which add weight, complexity/cost, and require additional radial space).

Figure 1:
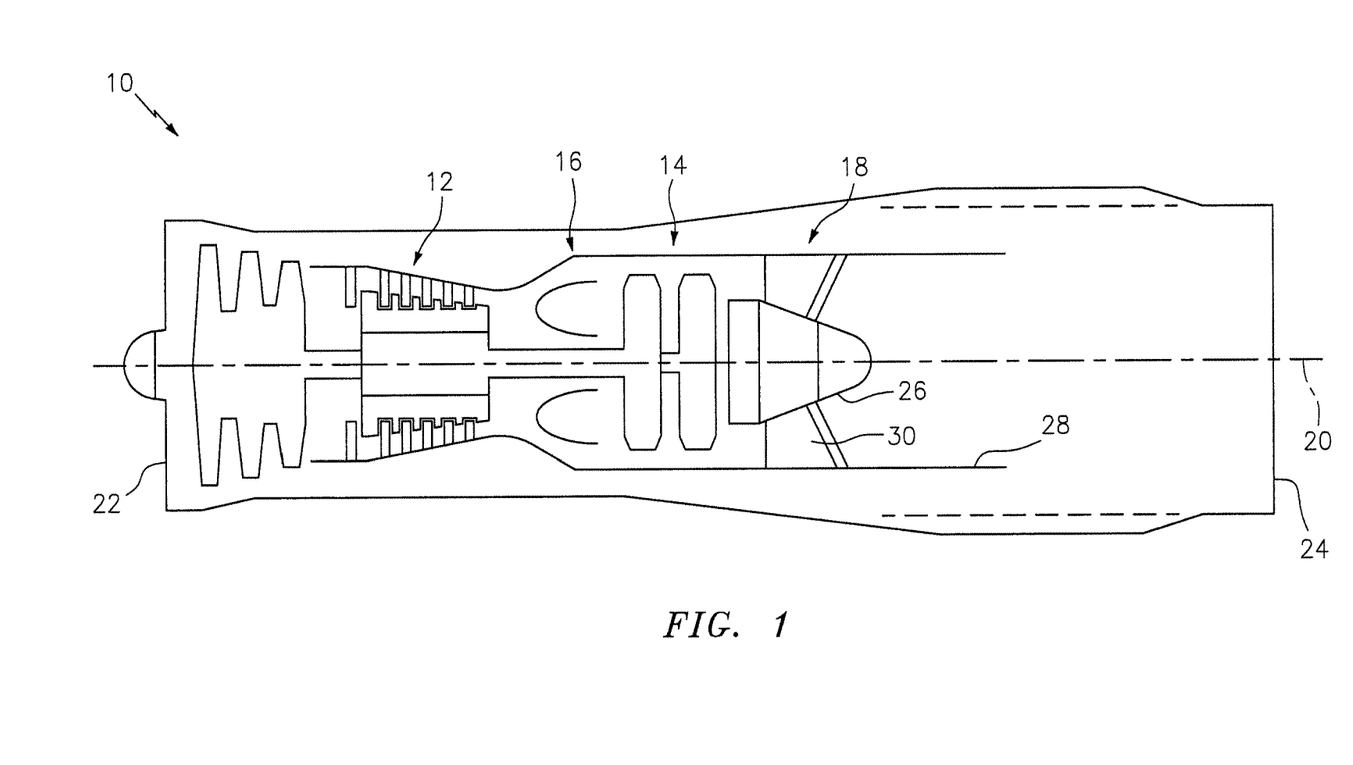
FIG. 1 illustrates a gas turbine engine.

Aspects of the disclosure may be applied in connection with a gas turbine engine. For example, FIG. 1 is a side-sectional illustration of a gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

FIG. 1 represents one possible configuration for an engine 10. Aspects of the disclosure may be applied in connection with other environments, including additional configurations for an engine of an aircraft.

Figure 2A:
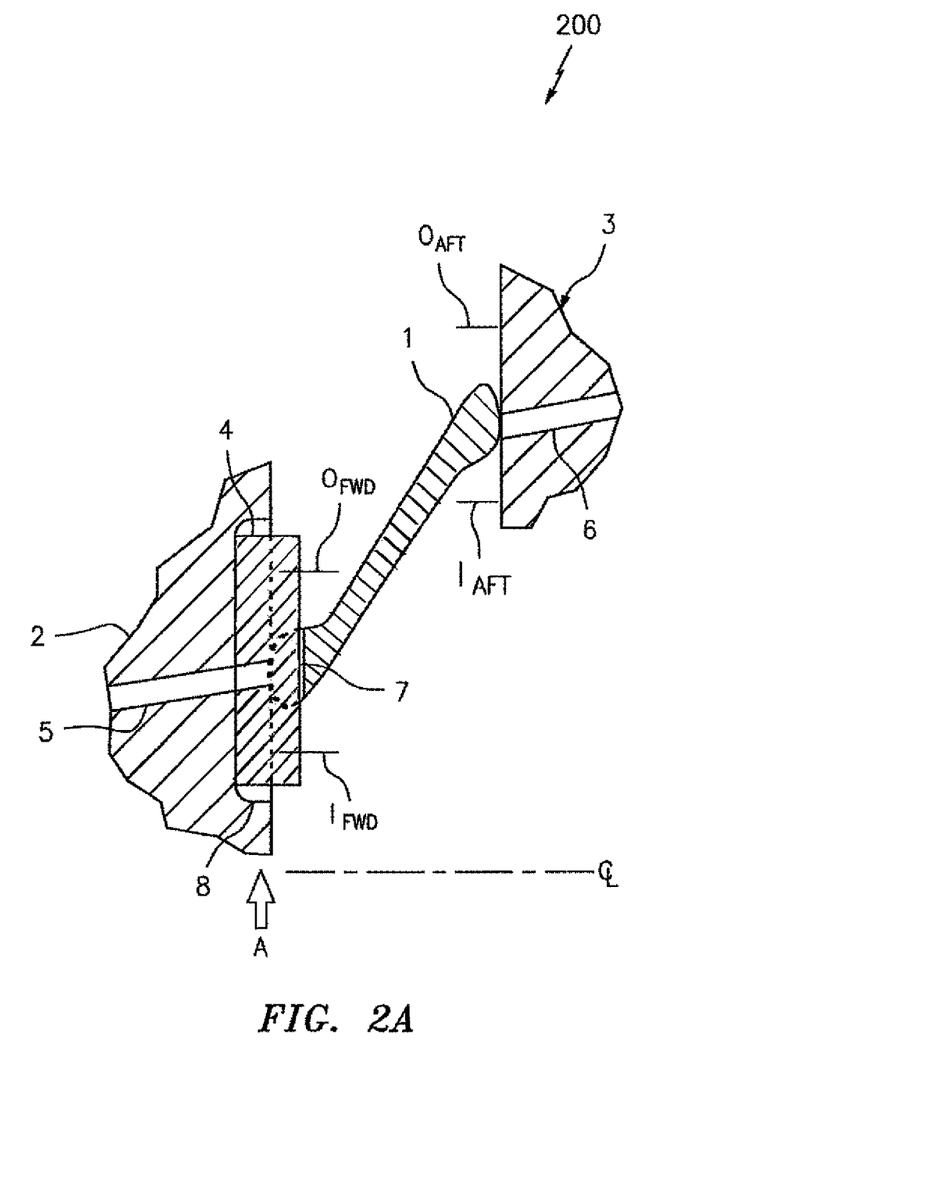
FIG. 2A illustrates an exemplary system incorporating a splined dog-bone seal maintained in a positional relationship to an engine centerline about a forward component and an aft component.
Figure 2B:
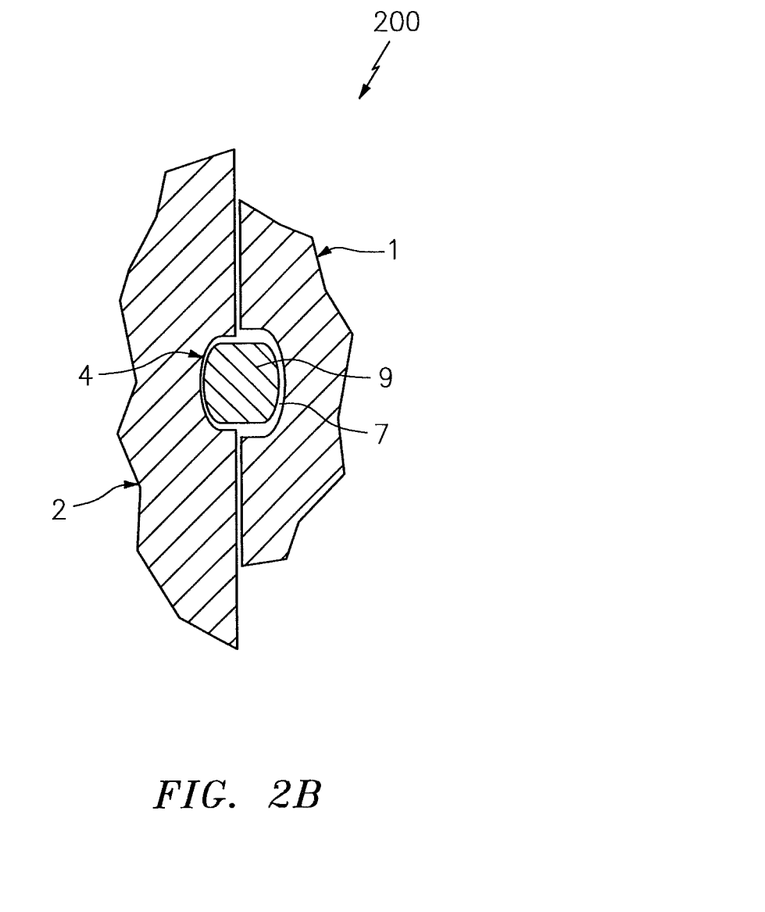
FIG. 2B illustrates a cross-sectional view 'A' of a portion of the splined dog-bone seal of FIG. 2A.

Referring now to FIGS. 2A-2B (collectively referred to herein as FIG. 2), a system 200 incorporating a splined dog-bone seal 1 is shown. Radial splines are occasionally used to keep parts centered (e.g., turbine inner air seals) relative to an engine centerline $C_L$ (e.g., centerline 20 of FIG. 1) and surrounding/mating parts, while allowing the splined part to move freely in the radial direction relative to its mating parts. The embodiment of FIG. 2 includes one or more radially-oriented pins 4 and associated radially-oriented slots 9 in the dog-bone seal 1 to center the seal 1 relative to a forward mating component 2 and an aft mating component 3.

In some embodiments, one or both of the forward mating component 2 and the aft mating component 3 may include one or more full-hoop components or segmented components. In some embodiments, one or both of the components 2 and 3 may include a flow path component, e.g., turbine blade outer air seal (BOAS), turbine vanes, or mid turbine frames, that may be subject to higher/elevated temperatures relative to a non-flow path component (e.g., an outer casing, BOAS/vane/seal supports or a transition duct). In this respect, a difference in temperature, coefficient of thermal expansion, and/or thermal response rate may exist between the forward mating component 2 and the aft mating component 3 which the dog-bone seal 1 may have to accommodate.

Figure 3:
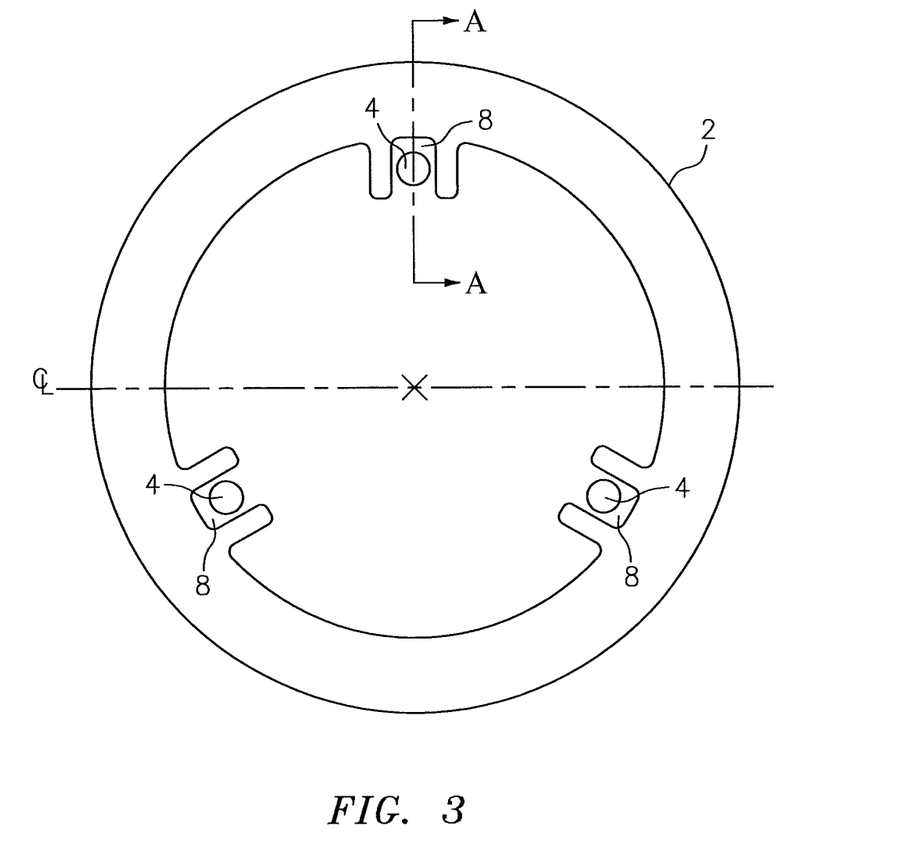
FIG. 3 illustrates an embodiment incorporating three equally spaced spline pins.

FIG. 2 shows a spline created by a combination of pins 4 coupled (e.g., brazed, welded, etc.) to pin slots 8 in the forward mating component 2 that are engaged with slots 9 in the dog-bone seal 1. Briefly referring to FIG. 3, an embodiment is shown that includes three pins 4 positioned one-hundred twenty degrees apart from one another. More than three pins 4 may be used in some embodiments. The pins 4 may be equally spaced. In some embodiments, the pins 4 may be asymmetrically spaced.

Figure 6:
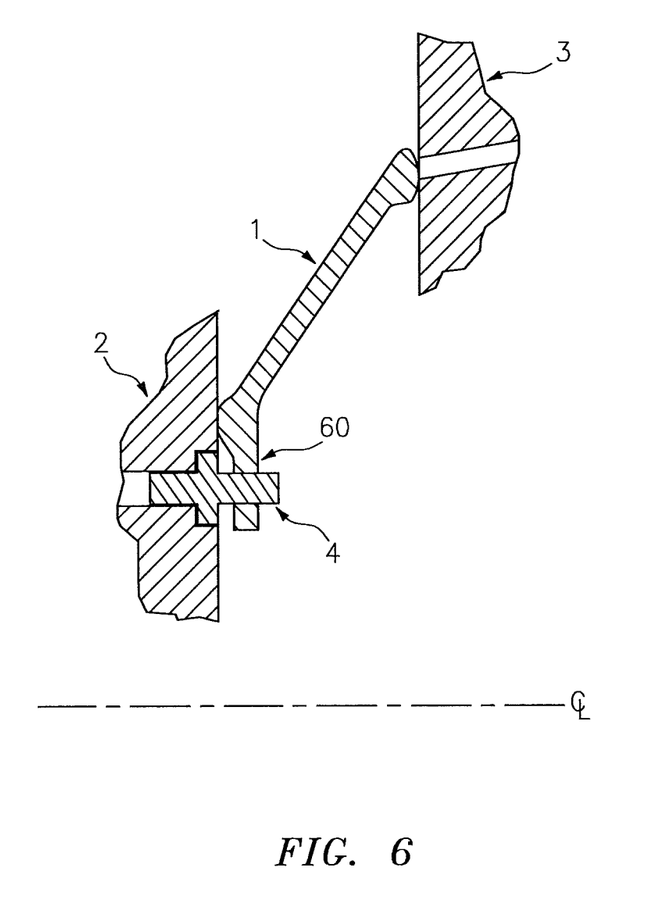
FIG. 6 illustrates an embodiment incorporated one or more radially-oriented spline pins.

Referring to FIG. 6, an embodiment incorporating a radially-oriented spline pin is shown. In FIG. 6, three or more equally spaced pins (reflected by reference character 4 in FIG. 6) are straddled by one or more local devises 60 in the dog-bone seal 1. The embodiment of FIG. 6 may be used to eliminate leakage at the spline features and simplify the protruding spline features.

Referring back to FIG. 2, as the forward component 2 and the aft component 3 move radially in and out relative to each other, as well as to the dog-bone seal 1, slots 9 in the seal 1 remain engaged with the radially-oriented pins 4 and only a small leakage gap 7 is maintained. Unlike other radially-based spline applications (e.g., turbine inner air seals, etc.), the embodiment of FIG. 2 may maintain a constant and small gap 7 so that leakage at the spline feature is minimized/small.

As shown in FIG. 2, one or more feather seal slots, such as feather seal slots 5 and 6, may be included in the forward component 2 and/or the aft component 3, respectively. The feather seal slots 5 and 6 may include a thin piece of sheet metal that may be used for coupling or interfacing to the dog-bone seal 1. Mechanical tolerances may dictate the existence or size of the gap 7 using such a coupling between the dog-bone seal 1 and the feather seal slots 5 and 6. In some embodiments, the feather seal slot 5 may be integral with the forward mating component 2. In some embodiments, the feather seal slot 6 may be integral with the aft mating component 3.

As a result of the configuration in FIG. 2, the dog-bone seal 1 maintains alignment with the sealing features in the components 2 and 3 (e.g., feather seals between a turbine vane and a blade outer air seal (BOAS)) at a given steady-state flight condition. Conversely, a conventional or non-splined dog-bone seal can float anywhere within the radial design space, causing misalignment and associated leakage at forward/aft sealing interfaces.

Due to thermal growth/expansion, the dog-bone seal 1 may move relative to one or more of the spline pin 4, the forward component 2, or the feather seal slot 5. The movement may occur within a first range denoted by the inner forward ($I_{FWD}$) and outer forward ($O_{FWD}$) reference points of FIG. 2. Similarly, the dog-bone seal 1 may move relative to one or more of the aft component 3 or the feather seal slot 6. The movement may occur within a second range denoted by the inner aft ($I_{AFT}$) and outer aft ($O_{AFT}$) reference points of FIG. 2. In some embodiments, the first range and/or the second range may be approximately four-tenths of an inch (0.4"), or approximately one centimeter (1 cm) of movement relative to $I_{FWD}$ and $O_{FWD}$ or $I_{AFT}$ and $O_{AFT}$.

Figure 4A:
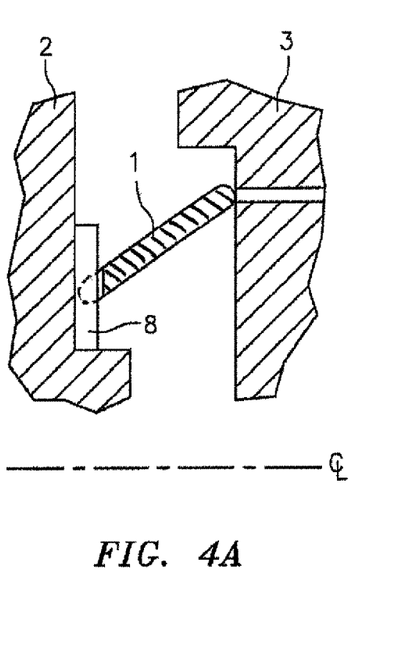
FIG. 4A illustrates a splined dog-bone seal in a steady-state condition.
Figure 4B:
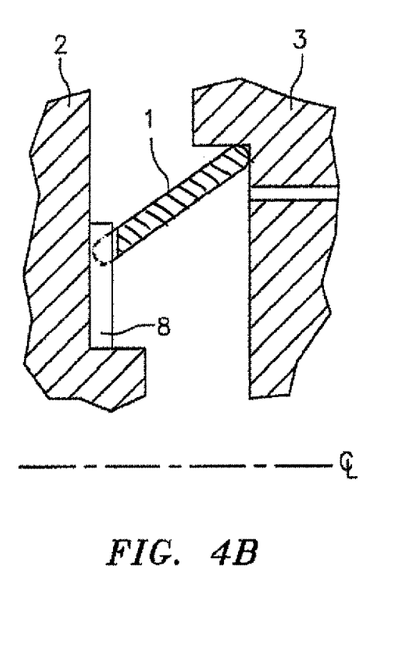
FIGS. 4B-4C illustrate a splined dog-bone seal during transient conditions.
Figure 4C:
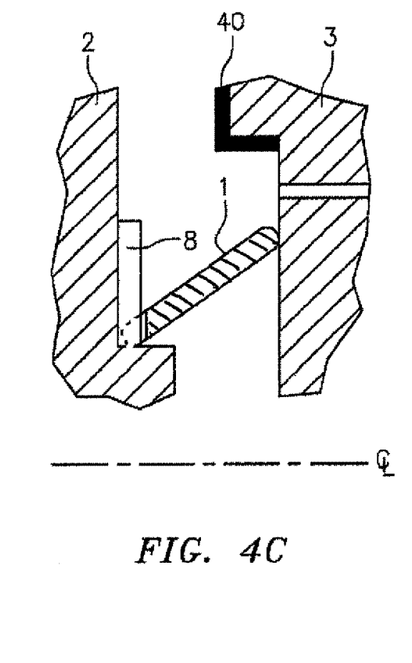

FIGS. 4A-4C illustrate the dynamic range that may be experienced by the dog-bone seal 1 relative to the forward component 2, the aft component 3, and the pin slot 8. FIG. 4A may be indicative of a steady-state condition, such as aircraft take-off or cruise. FIGS. 4B and 4C may be indicative of two extreme transient conditions; for example, FIG. 4B may be indicative of an acceleration of the aircraft and FIG. 4C may be indicative of a deceleration of the aircraft. In FIG. 4C, a stopper 40 is shown. The stopper 40 may be integral with one or more components, such as the aft mating component 3 as shown. The stopper 40 may not be included in some embodiments, given that a splined dog-bone seal in accordance with this disclosure stays significantly centered about the engine centerline $C_L$ (e.g., centerline 20) during all steady-state and transient conditions.

While not explicitly shown in FIGS. 4A-4C, the dog-bone seal 1 may line up with one or both of the feather seal slot 5, 6 at a bottom dead center (BDC) circumferential location as well.

In contrast to FIGS. 4A-4C, FIGS. 5A-5B illustrate a conventional dog-bone seal 501 that lacks a spline about a forward component 502 an aft component 503.

Figure 5A:
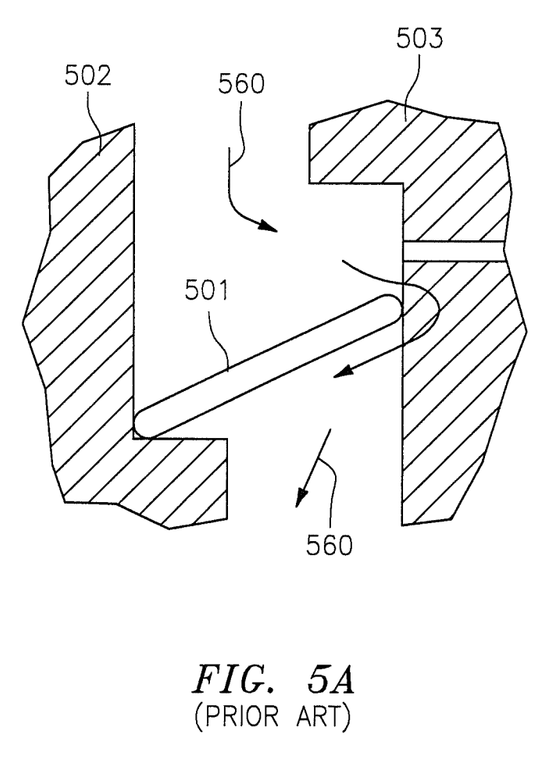
FIGS. 5A-5B illustrate a dog-bone seal that lacks a spline in accordance with the prior art.
Figure 5B:
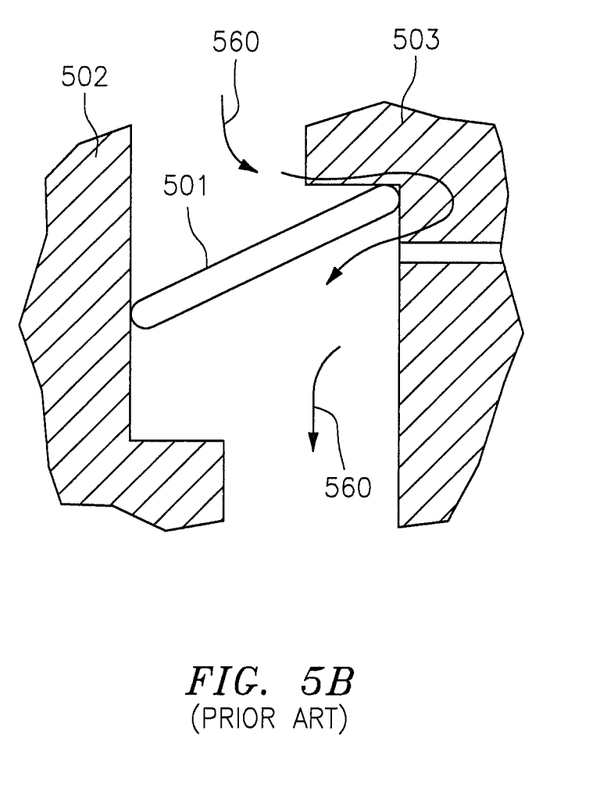

The environmental contexts/conditions in FIGS. 5A-5B may be the same as, or analogous to, the environmental contexts/conditions described above in connection with FIGS. 4B-4C. Regardless of the flight condition, there is nothing in FIGS. 5A-5B keeping the dog-bone seal 501 centered about the engine centerline, so the dog-bone seal 501 will move off-center in a radial direction until it bumps into a stopper (e.g., as shown in FIGS. 5A-5B) on the forward component 502 and/or the aft component 503. As such, at all flight conditions a leak path (as reflected via the arrows 560) is introduced between the dog-bone seal 501 and all, or nearly all, feather seals located at the gap between adjacent segmented components.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system for maintaining a seal about an engine centerline, comprising:
 a first component;
 a second component; and
 a radially movable dog-bone seal coupled to the first component and the second component,
 wherein the first component includes a spline that engages a radially oriented slot in the radially movable dog-bone seal to radially center the dog-bone seal relative to the first component and the second component, and the spline comprises a radially oriented headless pin that extends longitudinally along a longitudinal axis that is non-parallel with the engine centerline.

2. The system of claim 1, wherein the radially oriented headless pin is attached to a pin slot in the first component.

3. The system of claim 1, wherein the radially oriented headless pin is brazed to the pin slot in the first component.

4. The system of claim 1, wherein the first component comprises a full-hoop component.

5. The system of claim 4, wherein the second component comprises a segmented component.

6. The system of claim 1, wherein the first component comprises a flow path component.

7. The system of claim 1, wherein the dog-bone seal is configured to move relative to at least one of the first component and the second component within a range of approximately four-tenths of an inch.

8. The system of claim 1, wherein the radially oriented headless pin is arranged within the radially oriented slot in the radially movable dog-bone seal; and a radial length of the radially oriented headless pin is greater than a radial length of the radially oriented slot in the radially movable dog-bone seal.

9. The system of claim 1, wherein the longitudinal axis of the radially oriented headless pin is perpendicular to the engine centerline.

* * * * *